Inventors
John E. Cope
Donald H. Fisher
By
Holcombe, Wetherill & Brisebois
Attorneys Dec. 18, 1956 J. E. COPE ET AL 2,774,865

INTERFERENCE LIMITERS

Filed Dec. 15, 1955 3 Sheets-Sheet 2

Inventors
John E. Cope
Donald H. Fisher
By
Holcombe, Wetherill & Brisebois
Attorneys Dec. 18, 1956 J. E. COPE ET AL 2,774,865

INTERFERENCE LIMITERS

Filed Dec. 15, 1955 3 Sheets-Sheet 3

Inventors
John E. Cope
Donald H. Fisher
By [signature]
Attorneys

United States Patent Office 2,774,865

Patented Dec. 18, 1956

2,774,865

INTERFERENCE LIMITERS

John Edward Cope and Donald Henry Fisher, Cambridge, England, assignors to Pye Limited, Cambridge, England, a British company Application December 15, 1955, Serial No. 553,360

Claims priority, application Great Britain December 22, 1954

11 Claims. (Cl. 250—20)

The present invention relates to interference limiting circuits, and more particularly to circuit arrangements for limiting the interference on a received television signal.

The present invention provides an interference limiting circuit comprising an interference limiting rectifier to one electrode of which is fed the output signal from the video signal rectifier and which is normally held non-conducting during the video signal by a bias applied to its other electrode, but which on the ocurrence of an interference pulse, is rendered conducting by the interference pulse being applied to said other electrode whereby the signal is substantially reduced or suppressed during an interference pulse. The input signal applied to the interference limiting rectifier is arranged to be of greater amplitude than the input signal applied to the video signal rectifier whereby the limiting action is improved. This can be achieved by employing a different transformation ratio from the input tuned circuit to the interference limiting rectifier than the transformation ratio from the input tuned circuit to the video signal rectifier. For example, the input electrodes of the two rectifiers may be respectively connected to different tapping points on an auto-transformer.

The interference limiting rectifier and the video signal rectifier are preferably both connected to the input of the usual filter circuit associated with the signal rectifier. Alternatively, two separate filters may be employed connected together at their output ends, but since the interference pulses are somewhat integrated at this point the damping effect upon the tuned circuit associated with the detector circuit during an interference pulse may be reduced.

In one form of the invention the bias applied to the interference limiting rectifier is a D. C. potential of a value which is just sufficient to prevent conduction of the interference limiting rectifier at the maximum level (peak white) of the input modulated carrier waveform.

However, according to another feature of the present invention, the bias comprises a video waveform of opposite polarity to the video waveform applied to the input of the interference limiting rectifier whereby the effective clipping lever of the interference limiting rectifier can be brought nearer to the peak white level of the video detector output. If desired the video component of the bias may exceed the carrier input so that the effective bias level follows the video detector output to a greater or lesser extent.

In order that the invention may be more fully understood, reference will now be made to the accompanying drawings, in which.

Figure 1:
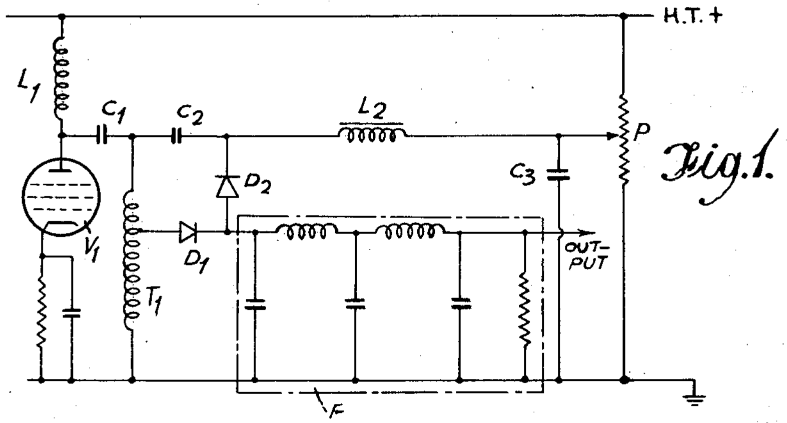
Figure 1 is one circuit arrangement according to the invention.

Referring to Figure 1, the output from a signal amplifying valve V1, for example the last stage of an intermediate frequency amplifier is fed through condenser C1 to the video signal rectifier D1. This rectifier is arranged to give a positive output and its input impedance is matched to the driving valve V1 by means of a suitably proportioned autotransformer T1 and choke coupling L1. A filter circuit F is connected to the output of the detector. According to the invention, a portion of the input signal is also applied through condenser C2 to an interference limiting rectifier D2 with opposite polarity to the input signal applied to the vision signal rectifier D1. The anode of the interference signal rectifier D2 is connected to the cathode of the video signal rectifier D1 and to the input of the filter F. A positive D. C. bias derived from the potentiometer P is applied to the cathode of the rectifier D2 through the choke L2 associated with the decoupling condenser C3.

In operation, when noise pulses are absent the video detector D1 operates in the normal way. The positive bias applied to the cathode of rectifier D2 is just sufficient to prevent conduction at the maximum level (peak white) of the carrier wave appearing across the tuned circuit. During an interference pulse both rectifiers D1 and D2 tend to conduct in opposite directions by an amount depending upon (*a*) the amplitude of the interference, (*b*) the setting of the bias potential derived from potentiometer P, (*c*) the ratio of transformation between the two connections to the tuned circuit (*d*) the characteristics of the two rectifiers.

In this way the effect of the interference pulse tends to be cancelled out, in addition to which the extra load is thrown upon the tuned circuit and valve V1 by the double conduction of the rectifiers D1 and D2.

Figures 2, 3:
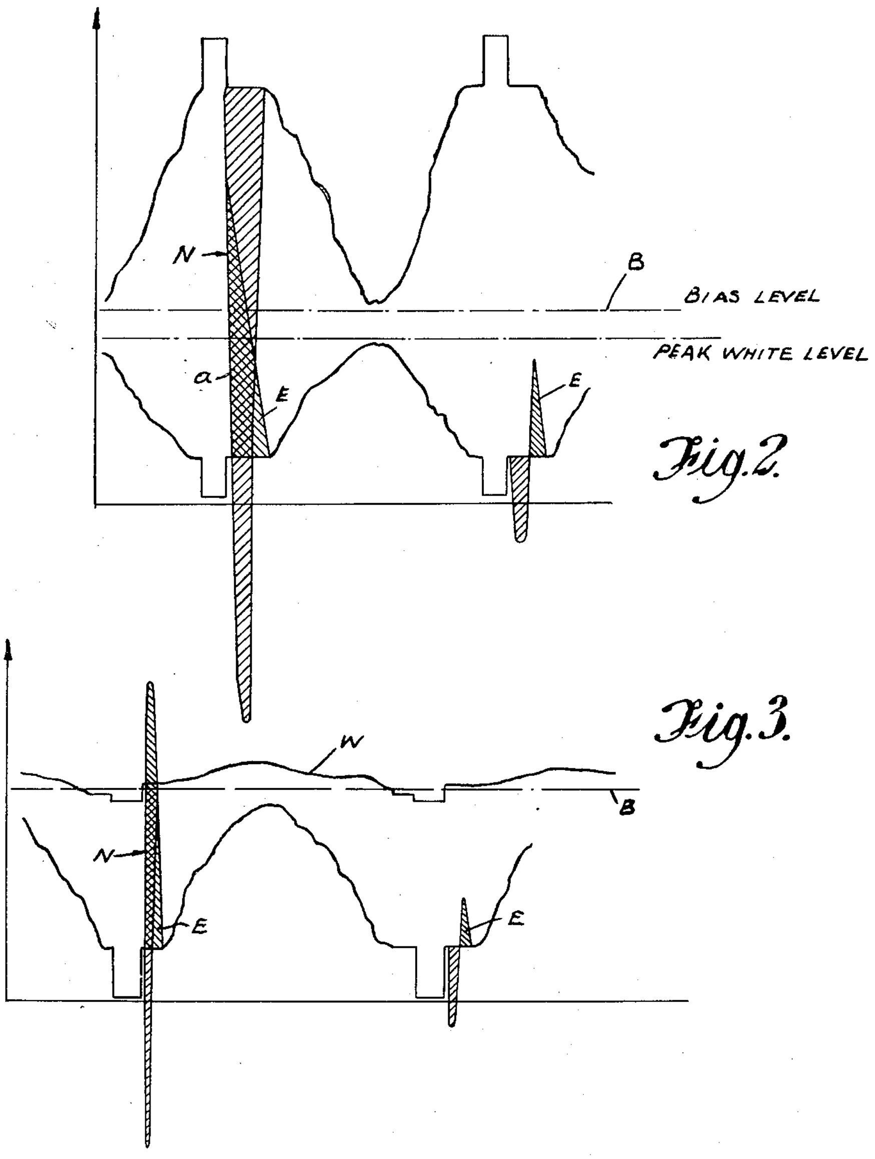
Figure 2, 3 and 4 are explanatory waveforms.

The operation of the circuit of Figure 1 is shown diagrammatically in Figure 2. It is assumed that the signal input to the noise limiting rectifier D2 is of an amplitude which is about twice that to the video signal rectifier D1 and the effective output if the rectifier D2 were conducting is shown extending downward towards the bias level B set by the potentiometer P. Conduction of rectifier D2 takes place when the two waveforms overlap as is the case during the interference pulses N. The actual area in which overlap takes place is shown by the cross-hatched area *a*. Notwithstanding the damping effect of the tuned circuit the greater effective output of the interference limiting rectifier D2 tends to produce a certain amount of "black spotting" when connected to a higher point on the intermediate frequency transformer winding T1.

Due to the fact that the trailing edge E of the pulse N, when returning to a level below peak white, receives no cancellation, as can be seen in Figure 2, slight trailing edges reaching to a medium white level remain. This is perfectly satisfactory for receivers requiring very good interference suppression at minimum cost. It is to be understood that effective decoupling must be provided for the D. C. bias source.

Figure 4:
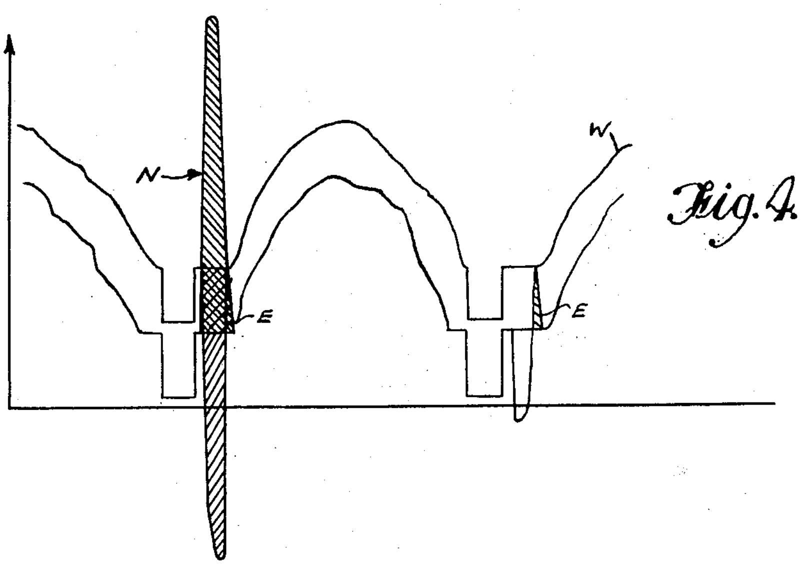

As is shown in Figure 3, it will be seen that if the effective video output of the noise limiting rectifier D2 were overcome by an opposite-polarity video waveform W applied with the D. C. bias B, then the effective clipping level represented by waveform W could be brought nearer to the peak white level of the actual video signal detector output. In actual fact, the video waveform applied with the D. C. bias B may exceed the carrier input so that the effective bias level may follow to a greater or lesser extent the detected output of rectifier D1. Figure 4 shows the increased limiting action then obtained, whilst it is also apparent that the amount of interference pulse input to the noise limiting rectifier D2 may be reduced as the video waveform added to the bias is increased, so that "black spotting" reduces (see Fig. 4).

The insertion of the video waveform on the bias must not place a high impedance in series with the rectifier D2 and the video waveform employed must also have but a small interference content.

The video waveform and bias may best be applied to the noise limiting rectifier D2 via a cathode follower having a low output impedance and providing a satisfactory video bandwidth.

Figure 5:
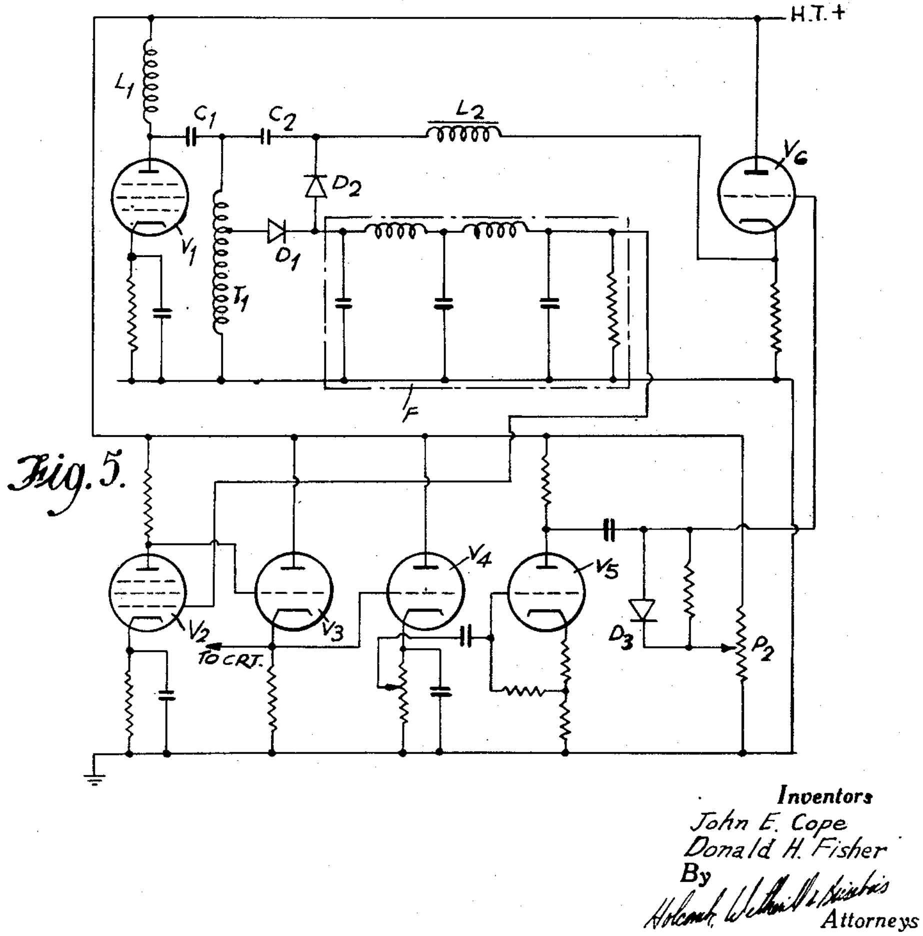
Figures 5 and 6 show modified circuit arrangements according to the invention.

One circuit arrangement for producing the improved noise-limiting action shown in Figures 3 and 4, is shown in Figure 5. The detector circuit is as shown in Figure 1, and the output detected signal from the filter F is fed to the pentode video amplifier V2 which feeds the cathode follower V3, the output of which is applied to the cathode ray tube. The output of V3 is also fed to a bandwidth limiting cathode follower V4 or similar bandwidth limiting device. The desired amount of video signal less the majority of impulsive interference, which is removed in the bandwidth limiting cathode follower V4, is then fed to the interference limiting rectifier D2 via the reversing valve V5 and the cathode follower V6. D. C. restoration is provided by the diode D3.

Figure 6:
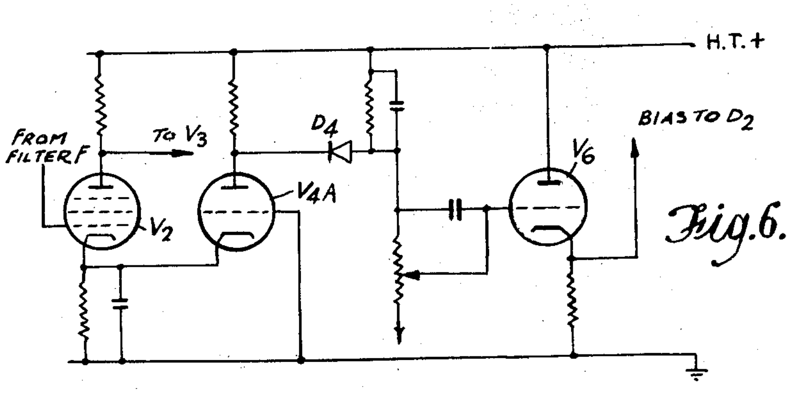

Figure 6 shows a simpler circuit arrangement in which the output from the video amplifier V2 fed from filter F is cathode-coupled to valve V4A to produce the desired video feedback voltage. A diode bandwidth limiting device D4 is used in such a way and with suitably chosen voltages so that the majority of the D. C. component is fed to the cathode follower V6 which feeds the interference limiting rectifier D2.

Whilst particular embodiments have been described it will be understood that various modifications may be made without departing from the scope of the invention. For example, instead of employing an auto-transformer for feeding the rectifiers D1 and D2 this may be replaced by a bifilar or other suitable transformer to which the interference limiting circuit is connected to give the desired output.

We claim:

1. An interference limiting circuit comprising an interference limiting rectifier having two electrodes, means for feeding the detected video signal to one electrode of said rectifier, means for applying a bias to the other electrode of said rectifier so that said rectifier is normally held non-conducting during the video signal, and means for applying the received television signal at a greater amplitude than that at which it is applied to the detector to said other electrode of the rectifier to render said rectifier conducting during interference pulses whereby the signal is substantially reduced or suppressed during the interference pulses.

2. An interference limiting circuit comprising an interference limiting rectifier having two electrodes, a transformer, means for feeding a television signal to said transformer, means for feeding a first voltage from said transformer to one electrode of said rectifier, means for applying a bias to the other electrode of said rectifier so that said rectifier is normally held non-conducting during the video signal, and means for applying a second voltage from said transformer, higher than said first voltage to said other electrode of the rectifier to render said device conducting during interference pulses whereby the signal is substantially reduced or suppressed during the interference pulses.

3. A circuit as claimed in claim 2, in which the first and second voltages are derived from different tapping points on an auto-transformer.

4. An interference limiting circuit comprising an interference limiting rectifier having two electrodes, means for feeding the detected video signal to one electrode of said rectifier, means for applying a direct current bias to the other electrode of said rectifier so that said rectifier is normally held non-conducting during the video signal, and means for applying the received television signal at a greater amplitude than that at which it is applied to the detector to said other electrode of the rectifier to render said rectifier conducting during interference pulses whereby the signal is substantially reduced or suppressed during the interference pulses.

5. An interference limiting circuit comprising an interference limiting rectifier having two electrodes, means for feeding the detected video signal to one electrode of said rectifier means for applying a bias including a video waveform of opposite polarity to the video waveform applied to said one electrode of the rectifier, to the other electrode of the rectifier so that said rectifier is normally held non-conducting during the video signal, and means for applying the received television signal at a greater amplitude then that at which it is applied to the detector to said other electrode of the rectifier to render said rectifier conducting during interference pulses whereby the signal is substantially reduced or suppressed during the interference pulses.

6. An interference limiting circuit comprising a detector having an input electrode and an output electrode, an interference limiting rectifier having a first electrode and a second electrode, means connecting the first electrode of the interference limiting rectifier to the output electrode of the detector, a tuned circuit across which received television signals are developed means for feeding a voltage from said tuned circuit to the input electrode of said detector, a condenser connected to the second electrode of said interference limiting rectifier, means for feeding a voltage from said tuned circuit to said condenser, which is greater than the voltage fed to the detector, and said noise limiting rectifier, and means for applying a bias to the second electrode of said interference limiting rectifier.

7. A circuit as claimed in claim 6, in which the bias applied to the interference limiting rectifier is a direct current bias.

8. An interference limiting circuit comprising a detector having an input electrode and an output electrode, an interference limiting rectifier having a first electrode and a second electrode, means connecting the first electrode of the interference limiting rectifier to the output electrode of the detector, a tuned circuit across which received television signals are developed, means for feeding a voltage from said tuned circuit to the input electrode of said detector, a condenser connected to the second electrode of said interference limiting rectifier, means for feeding a voltage from said tuned circuit to said condenser which is greater than the voltage fed to the detector, a filter circuit connected to said detector and said noise limiting rectifier, and means for feeding the output of said filter circuit as a bias to the second electrode of said interference limiting rectifier.

9. A circuit as claimed in claim 8, in which the output signal from the filter applied as a bias is fed through a bandwidth limiting device.

10. An interference limiting circuit comprising a detector having an input electrode and an output electrode, an interference limiting rectifier having a first electrode and a second electrode, means connecting the first electrode of the interference limiting rectifier to the output electrode of the detector, a tuned circuit across which received television signals are developed, means for feeding a voltage from said tuned circuit to the input electrode of said detector, a condenser connected to the second electrode of said interference limiting rectifier, means for feeding a voltage from said tuned circuit to said condenser which is greater than the voltage fed to the detector, a filter circuit connected to said detector and said noise limiting rectifier, means for feeding the output of said filter circuit to a video amplifier, a cathode follower connected to said video amplifier and means for feeding a signal from said cathode follower through a bandwidth limiting device as a bias to the second electrode of said interference limiting rectifier.

11. An interference limiting circuit comprising a detector having an input electrode and an output electrode, an interference limiting rectifier having a first electrode and a second electrode, means connecting the first electrode of the interference limiting rectified to the output electrode of the detector, a tuned circuit across which received television signals are developed, means for feeding a voltage from said tuned circuit to the input electrode of said detector, a condenser connected to the second electrode of said interference limiting rectifier, means for feeding a voltage from said tuned circuit to said condenser which is greater than the voltage fed to the detector, a filter circuit connected to said detector and said noise limiting rectifier, and means for feeding the output of said filter circuit through a bandwidth limiting device and a cathode follower as a bias to the second electrode of said interference limiting rectifier.

References Cited in the file of this patent

UNITED STATES PATENTS 2,668,234 Druz ---------------- Feb. 2, 1954

FOREIGN PATENTS 624,522 Great Britain ---------- June 10, 1949

137,715 Australia -------------- June 26, 1950